(12) United States Patent
King et al.

(10) Patent No.: US 9,664,892 B2
(45) Date of Patent: May 30, 2017

(54) HYBRID LASER EXCITED PHOSPHOR ILLUMINATION APPARATUS AND METHOD

(71) Applicant: TEXAS INSTRUMENTS INCORPORATED, Dallas, TX (US)

(72) Inventors: Philip Scott King, Allen, TX (US); Gregory Scott Pettitt, Farmersville, TX (US); Sajjad Ali Khan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 89 days.

(21) Appl. No.: 14/155,009

(22) Filed: Jan. 14, 2014

(65) Prior Publication Data

US 2014/0253882 A1    Sep. 11, 2014

Related U.S. Application Data

(60) Provisional application No. 61/752,294, filed on Jan. 14, 2013.

(51) Int. Cl.
  *G03B 21/20* (2006.01)
  *G02B 26/00* (2006.01)
  *H04N 9/31* (2006.01)

(52) U.S. Cl.
  CPC ......... *G02B 26/008* (2013.01); *H04N 9/3114* (2013.01); *H04N 9/3158* (2013.01); *H04N 9/3161* (2013.01); *G03B 21/204* (2013.01)

(58) Field of Classification Search
  CPC ... G03B 21/204; H04N 9/3161; H04N 9/3114
  See application file for complete search history.

(56) References Cited

U.S. PATENT DOCUMENTS

| | | | |
|---|---|---|---|
| 2010/0315604 A1* | 12/2010 | Peeters | G02B 26/008 353/84 |
| 2011/0211333 A1 | 9/2011 | Bartlett | |
| 2012/0201030 A1* | 8/2012 | Yuan | G02B 26/008 362/293 |
| 2013/0100420 A1* | 4/2013 | Ferri | G03B 21/204 353/31 |
| 2013/0242534 A1 | 9/2013 | Pettitt et al. | |

* cited by examiner

*Primary Examiner* — Sultan Chowdhury
*Assistant Examiner* — Danell L Owens
(74) *Attorney, Agent, or Firm* — Michael A. Davis, Jr.; Charles A. Brill; Frank D. Cimino (57) ABSTRACT

Apparatus and methods are disclosed for generating blue color illumination for use in a projection system. Light from a blue laser light source is reflected off a dichroic filter sequentially onto different color emitting phosphor coated light non-transmissive segments and onto a cyan color emitting phosphor coated light transmissive segment of a rotating color wheel. The different color light and cyan color light emitted by the phosphor back to the filter is selectively transmitted by the filter along a projection path. Blue laser light and cyan color light emitted by the phosphor transmitted through the color wheel is directed along a wraparound optical path back to the filter for reflection along the projection optical path.

1 Claim, 11 Drawing Sheets

HYBRID LASER EXCITED PHOSPHOR ILLUMINATION APPARATUS AND METHOD

This application claims the benefit of Provisional Application No. 61/752,294, filed Jan. 14, 2013, and the entirety of which is hereby incorporated by reference.

BACKGROUND

This relates to generation of blue color illumination in solid state laser projection systems and the like.

An example solid state projector using blue lasers and a phosphor color wheel as an illumination source and a spatial light modulator for modulation of the emitted light is described in application Ser. No. 13/652,129 filed Oct. 15, 2012, entitled "Projector Light Source and System, Including Configuration for Display of 3D Images," the entirety of which is incorporated herein by reference. Such system utilizes blue lasers as a direct source of blue color light and utilizes the blue lasers as an indirect source of other color light by energizing other color light producing phosphors with the blue color light from the blue lasers. Efficient blue lasers available for use in such solid state projectors are, however, often not of suitable wavelength to create a pleasing blue color when observed displayed on a screen or other display surface.

A typical phosphor color wheel as used in the described solid state projector has arcuate segments coated with different color emitting phosphors annularly positioned at circumferentially angularly spaced locations about a circular wheel. An example color wheel having circular tracks or bands of different color emitting phosphors spaced at different concentric radially spaced locations is described in Patent Application Pub. No. US 2011/0211333 A1, published Sep. 1, 2011, entitled "Wavelength Conversion," the entirety of which is incorporated herein by reference.

SUMMARY

In an example implementation of the claimed invention, a described projector system utilizes a phosphor with a cyan emission spectrum to convert a portion of the blue laser light as needed to create a blue color that is more visually pleasing (such as 460 nm dominant wavelength).

DETAILED DESCRIPTION OF EXAMPLE EMBODIMENTS

Blue and cyan colors may appear violet when displayed from solid state projectors (e.g., such as described in application Ser. No. 13/652,129) utilizing blue color lasers with wavelengths below 460 nm both as a direct source of displayed blue color and as a phosphor excitation source for displayed other colors. A more pleasing blue color point is obtainable by utilizing a cyan light emitting phosphor in combination with the blue laser light as the blue color light. Moreover, using the cyan light emitting phosphor in combination with the blue laser light reduces the need for a diffuser which has been used where the blue laser light is used directly, because the phosphor serves as a diffuser. Also, mixing the incoherent light emitted by the phosphor with coherent light from the laser may reduce some of the eye safety concerns.

Figure 1:
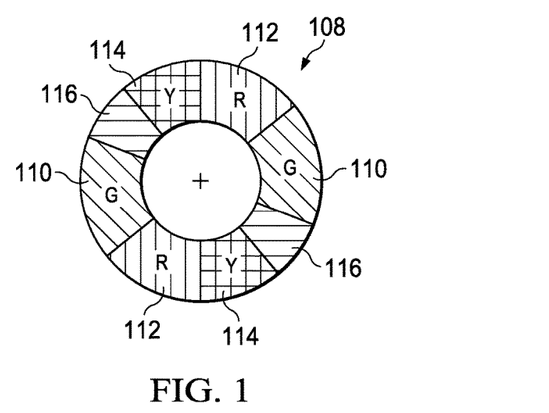
FIGS. 1-3 illustrate a typical arrangement for a solid state projector that uses blue lasers and a phosphor wheel as a sequential color illumination source.
Figure 2:
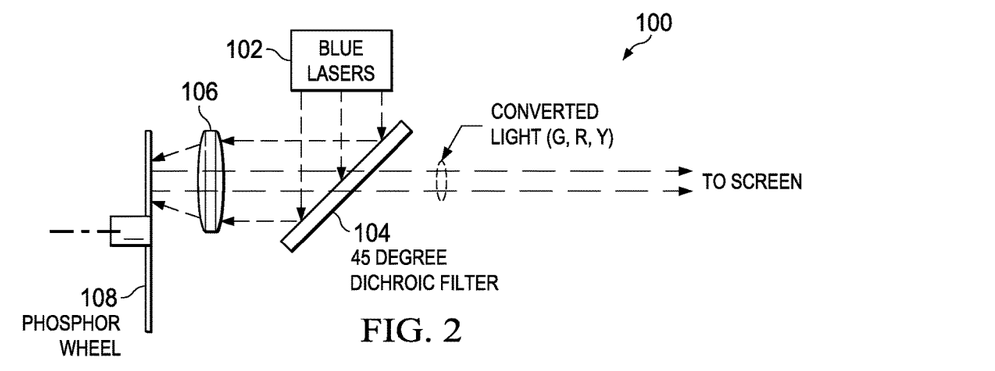
Figure 3:
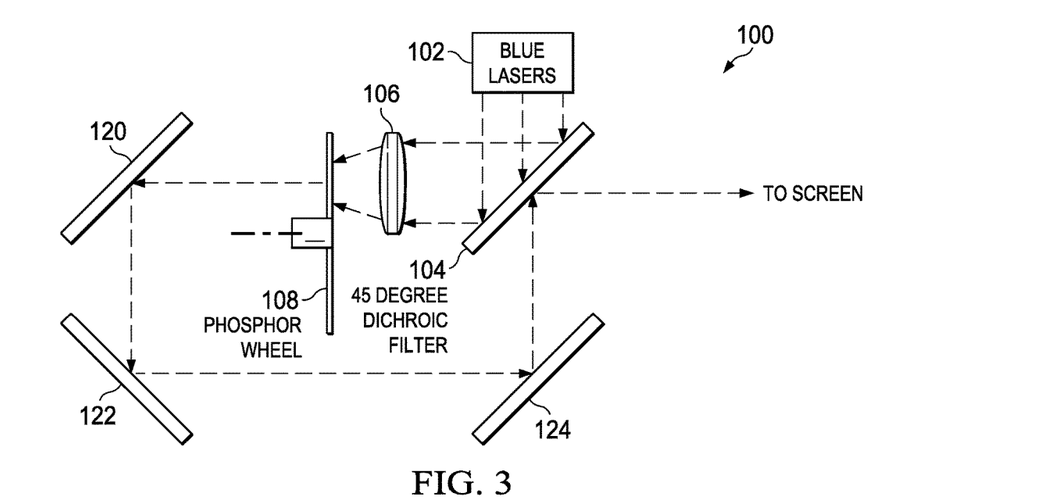
Figure 4:
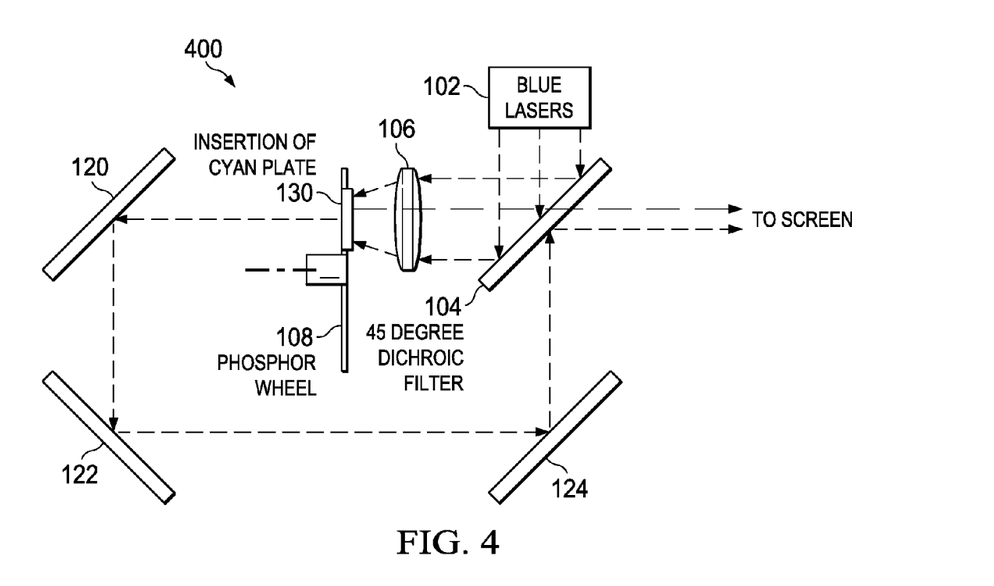
FIGS. 4-7 illustrate an implementation wherein a cyan light emitting phosphor is used in combination with the blue laser light in a sequential color illumination source.

FIGS. 1-3 illustrate a typical arrangement 100 for a solid state projector that uses blue lasers and a phosphor wheel as a sequential color illumination source, such as described in application Ser. No. 13/652,129. A bank of lasers 102 directs blue color coherent laser light onto a dichroic filter 104 which reflects the laser light via a focusing lens 106 onto a color wheel 108. The color wheel (see FIG. 1) 108 includes angularly spaced segments 110, 112, 114 of respective different color wavelength light emitting phosphors formed over a light reflecting surface, as well as clear laser blue color wavelength light transmitting segments 116. The laser light is focused to be sequentially incident on the respective different segments 110, 112, 114, 116 as the wheel 108 is rotated.

FIG. 2 illustrates the case of the blue laser sequentially incident upon segments 110, 112, 114 of green, red and yellow light emitting phosphors, respectively. The light from the lasers 102 is reflected by the filter 104 onto each segment 110, 112, 114 as the wheel rotates. When the blue light is incident on a particular phosphor covered segment, the phosphors at that segment are energized to emit the color wavelength light characteristic of the phosphors of that segment. In the illustrated arrangement, as the wheel rotates the laser light is first incident on a green light emitting phosphor segment 110, then on a red light emitting phosphor segment 112, and then on a yellow phosphor emitting segment 114. In each case, the emitted color (G, R, Y) is directed back through the lens 106 toward the dichroic filter 104, which passes the emitted color for modulation by the spatial light modulator and through projection optics onto a screen or other display surface. The spatial light modulator—which may, for example, include a micromirror array such as a Texas Instruments DLP™ digital micromirror device (DMD)—includes light modulating elements that can be individually controlled in synchronism with the emitted light to set the illumination intensity for that color contribution to corresponding individual ones of pixels of the displayed image. For example, the modulating elements may be controlled to provide a grayscale contribution of each color for the pixels using "on"/"off" settings specified for different time slices of a pulse width modulation (PWM) cycle time, with the greater number of "on" times providing a greater intensity, and the greater number of "off" times providing a lesser intensity—the cumulation of the PWM cycles for all the colors being integrated by the eye to give a particular color point and intensity for each pixel during a given image frame display time.

FIG. 3 illustrates the case of the blue laser direct illumination for establishing the blue color light contribution. Here, as before, the laser light is reflected by the filter 104 onto the color wheel 108; however, instead of being incident on a phosphor covered segment, the light is incident on one of one or more clear segments or slits 116. The clear segments 116 enable the blue light from the laser bank 102 to be used directly by passing it through a clear segment or slit 116 in the wheel 108, and reflecting it back (for example, by reflection off mirrors 120, 122, 124) to the other side of the dichroic filter 104, which reflects the laser light for modulation by the spatial light modulator and through the projection optics to set the blue color contributions of the pixels in synchronism with PWM duty cycle "on"/"off" settings generated in coordination with the blue light contribution intensities determined for each pixel from an incoming video source image frame signal.

FIGS. 4-7 illustrate an implementation 400 of the claimed invention wherein a cyan light emitting phosphor is used in combination with the blue laser light in a sequential color illumination source for a solid state projector of the type described in application Ser. No. 13/652,129. In the illustrated arrangement, cyan color emitting phosphors are deposited on a transparent plate 130 over the clear segments or slits 116 of the color wheel. Light from the lasers 102 is directed toward the color wheel 108 as previously described. However, in the case of establishing the blue light segment, instead of being transmitted through the clear segments 116 as described above, the blue laser light reflected from the dichroic filter 104 strikes the cyan color emitting phosphors on the plate 130 resulting in both transmission of a portion of the blue laser light for direct use and use of another portion of the blue laser light for energizing the emission of cyan color wavelength light by the cyan color emitting phosphor. As shown schematically in FIG. 4, light emitted by the cyan color emitting phosphor in the direction of the lens 106 is passed by the dichroic filter 104 and conveyed to the spatial light modulator for projection onto the screen. Blue laser light passing through the transparent plate 130, on the other hand, is reflected off the mirrors 120, 122, 124 along a path back to the other side of the dichroic filter 104 and then, together with the phosphor emitted cyan light, to the spatial light modulator for establishment of the blue/cyan color contribution to the displayed image. The combination of the non-coherent cyan emissions with the direct coherent blue laser light offers advantages for blue color uniformity, speckle performance and eye safety.

Figure 5:
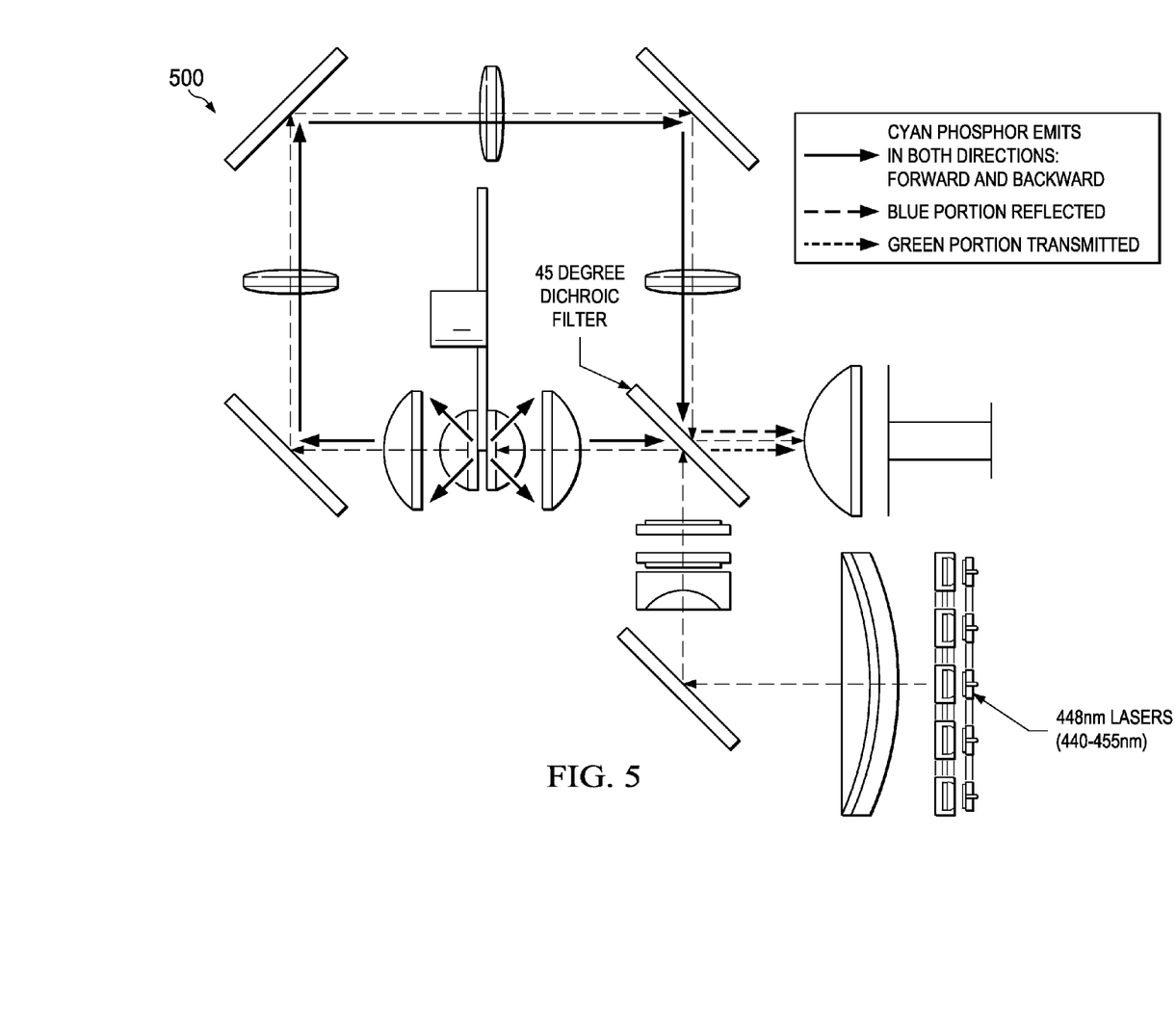

FIG. 5 illustrates details of an implementation 500 wherein blue laser light is utilized that has a wavelength of 448 nm (440-455 nm). Here the cyan emitting phosphors are applied as a coating over transparent portions at segments 116 of the color wheel 108 (see FIG. 6). Part of the light from the laser reflected off the 45° angled dichroic filter 104 and directed at the color wheel 108 passes through the transparent portion and is reflected though the wraparound optical path 120, 122, 124 back to the other side of the filter 104, and toward the projection optics. Another part of the light from the laser energizes the cyan emitting phosphors which coat the transparent substrate. A portion of the cyan emission is emitted in the forward direction for capture by the lens 106, transmission through the filter 104 and conveyance with the wraparound blue light toward the projection optics. Another portion of the cyan emission is emitted in the opposite direction, through the coated substrate 116 and toward the dichroic filter 104 via the blue light wraparound path. The wraparound cyan emission portion is then split at the dichroic filter 104 according to its constituent wavelength components, with a reflected portion going toward the projection optics and a transmitted portion being directed elsewhere through the filter. If the angled filter has a nominal cutoff wavelength of about 490 nm, for example, the wraparound cyan emission will be split approximately in half, with the shorter wavelength bluish portion being added to the forward emitted cyan and wraparound blue laser light and directed toward the modulator and projection optics, and with the longer wavelength greenish color portion being transmitted through the filter and away from the projection optics.

Figure 7:
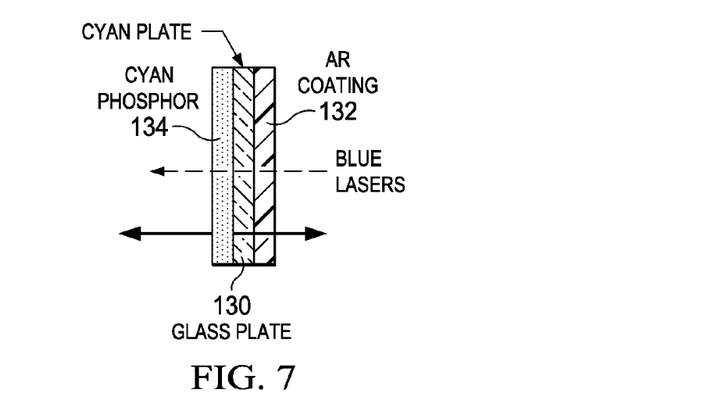

For the illustrated embodiment wherein cyan color light is captured from both forward emission and emission along the blue color wraparound path, the wheel 108 may be a metal (e.g., aluminum) body having a reflective front surface, with cyan emitting phosphor covered clear segments established by inserting clear glass plates 130 at apertures formed in the wheel 108. The glass plates 130 may be coated on a front side (side facing dichroic filter 104) with an antireflective (AR) coating 132, and may be coated with the cyan emitting phosphors 134 on the opposite side, as shown in FIG. 7. The antireflective coating will inhibit reflections of the incident blue laser light.

Figure 6:
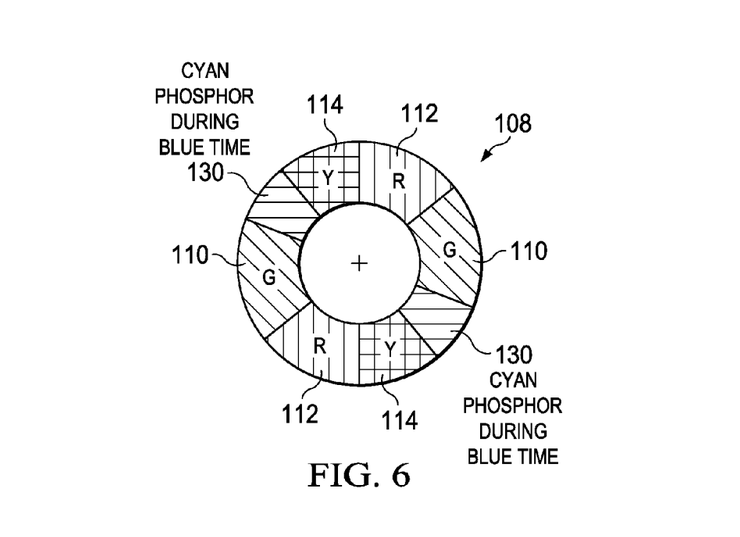
Figure 8:
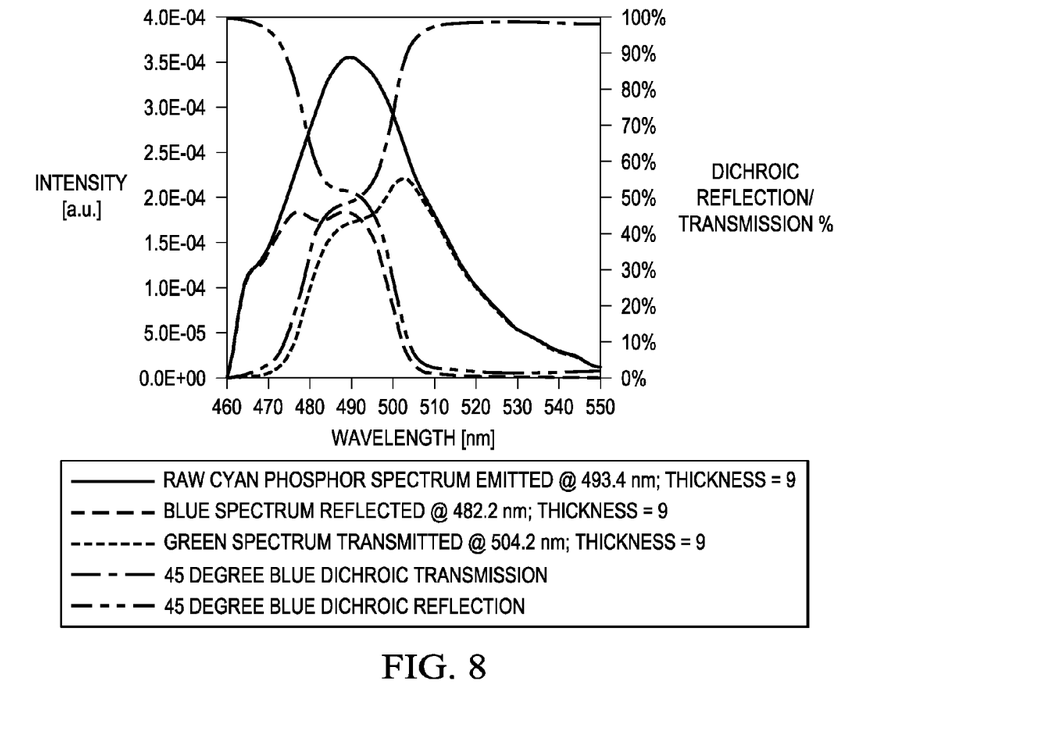
FIGS. 8-9 illustrate an example of the emission spectrum provided using the embodiment illustrated in FIGS. 5-7.
Figure 9:
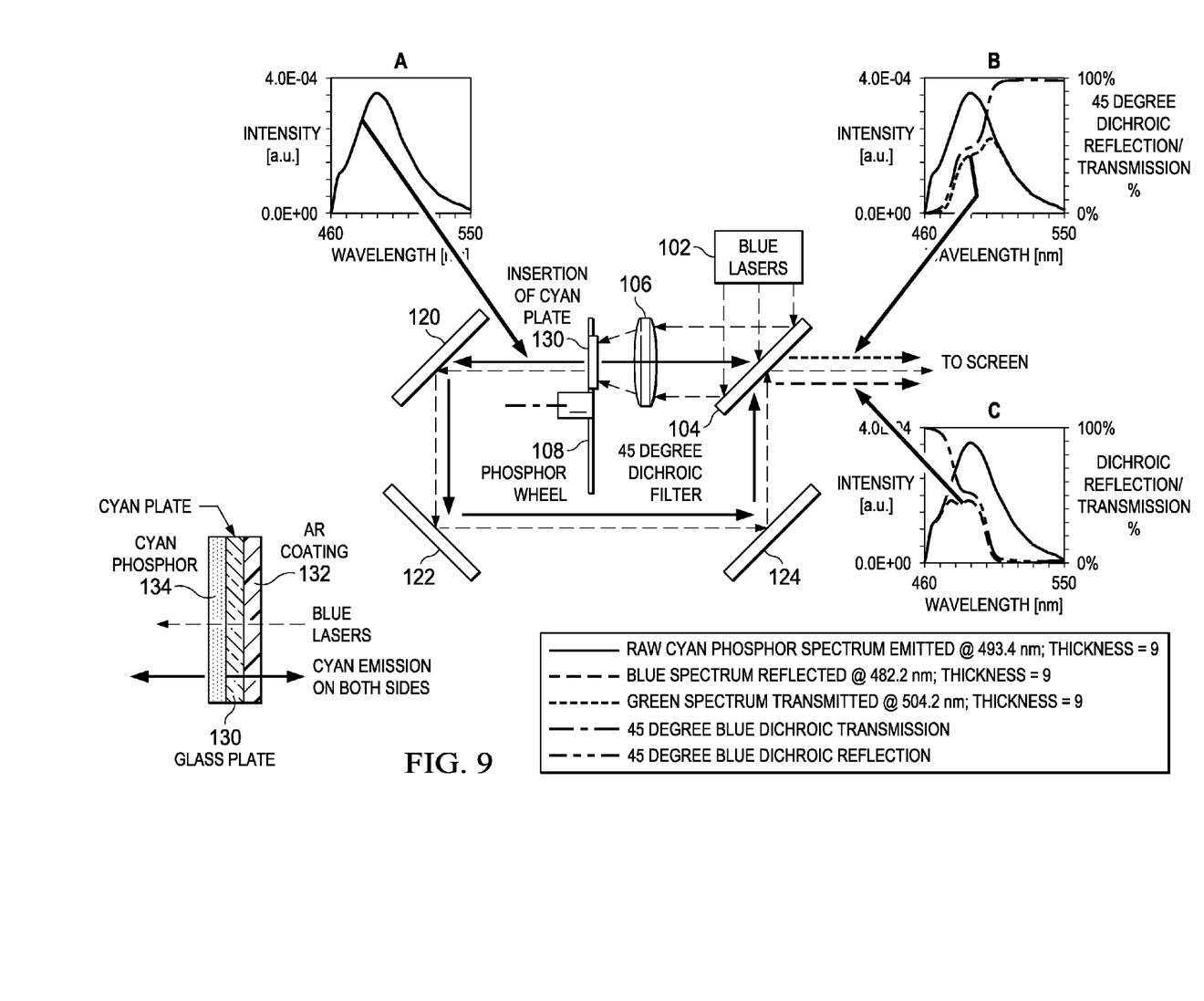

FIG. 8 illustrates an example of the emission spectrum provided using the embodiment illustrated in FIGS. 5-7 and a 45° dichroic filter having the reflection/transmission % vs. wavelength profile shown (transmitting nearly all light above 510 nm, reflecting nearly all light below 460 nm, and transmitting/reflecting 50% light around 480-490 nm). The same information is given in context in FIG. 9. The cyan color light emitted by the phosphor in both the forward and wraparound paths has an intensity vs. wavelength profile with a peak at 493.4 nm as shown at A. The blue component of the forward emitted cyan color light is reflected away from the SLM and projection optics by the dichroic filter. The green component of the forward emitted cyan color light is transmitted to the SLM and projection optics by the dichroic filter, with a forward transmitted green color component intensity vs. wavelength profile characteristic having a peak at 504.2 nm as shown at B. The blue component of the cyan color light emitted along the wraparound path is reflected toward the SLM and projection optics by the dichroic filter, with a reflected blue color component intensity vs. wavelength profile characteristic having a peak at 482.2 nm as shown at C. The green component of the cyan color light emitted along the wraparound path is transmitted away from the SLM and projection optics by the dichroic filter.

Figure 10:
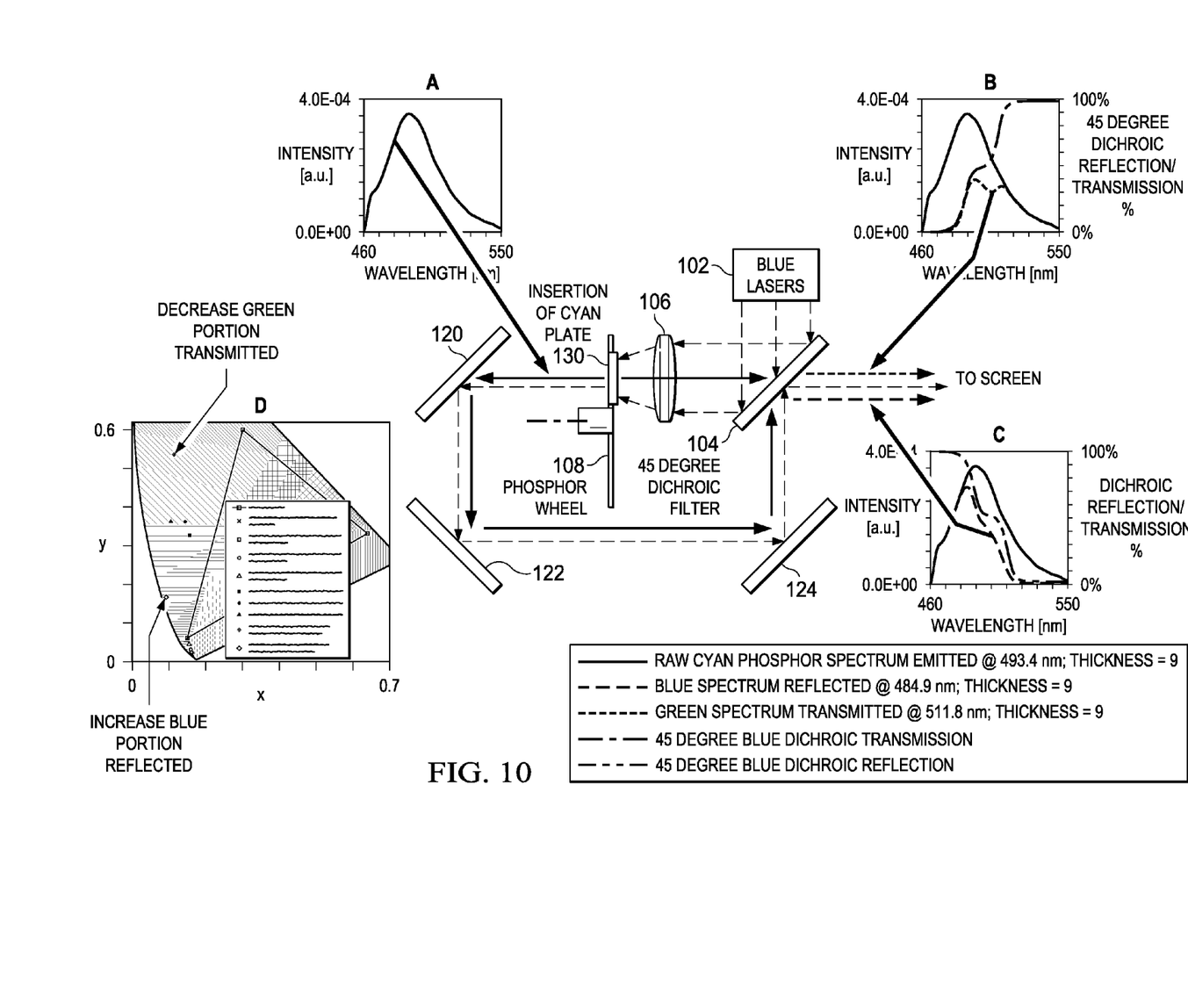
FIGS. 10-11 illustrate a modified arrangement wherein a transmissive dichroic filter is added ahead of the cyan emitting phosphor.
Figure 11:
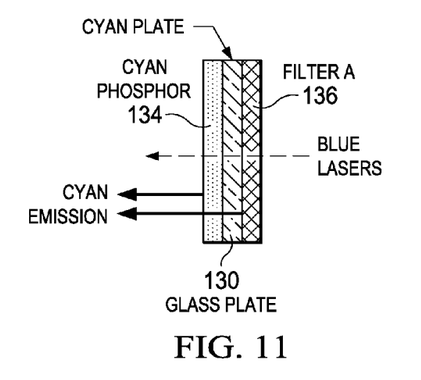

FIGS. 10-11 illustrate the emission characteristics for an arrangement 1000 wherein the glass plates 130 are configured with a blue color transmissive dichroic filter (filter A) 136 formed parallel with the glass on the front side and cyan emitting phosphors 134 forming a coating on the opposite (wraparound path) side. Here, the blue light from the laser source 102 reflected from the 45° filter 104 to be incident on the color wheel clear segments 116 passes through the clear segment filter (filter A) 136 before impinging of the cyan emitting phosphor glass rear side coating 134. The cyan color light emitted by the phosphor 134 in the wraparound path direction will wraparound and be reflected by the 45° dichroic filter 104 with an intensity vs. wavelength profile as described previously. The cyan color light emitted by the phosphor 134 in the forward path direction will, however, be reflected by filter A 136 to also travel along the wraparound path. Thus, more of the cyan color travels on the wraparound path than before, and the blue component of the greater amount of cyan directed around the wraparound path will be reflected toward the SLM and projection optics by the 45° dichroic filter 104. The green component will, however, be transmitted away from the SLM and projection optics by the 45° dichroic filter 104 after traversing the wraparound path.

For the embodiment of FIGS. 10-11, filter A 136 is chosen with a profile characteristic that transmits the blue laser light wavelengths (440-455 nm) but reflects the longer wavelengths (>455 nm). The profile characteristic of the 45° dichroic filter 104 is shifted right to provide a longer wavelength cutoff than the nominal (nominal=490 nm) for FIGS. 8-9. This right shift increases the amount of green transmitted as compared to blue reflected, in order to improve the resultant blue color point (see D in FIG. 10).

Figure 12:
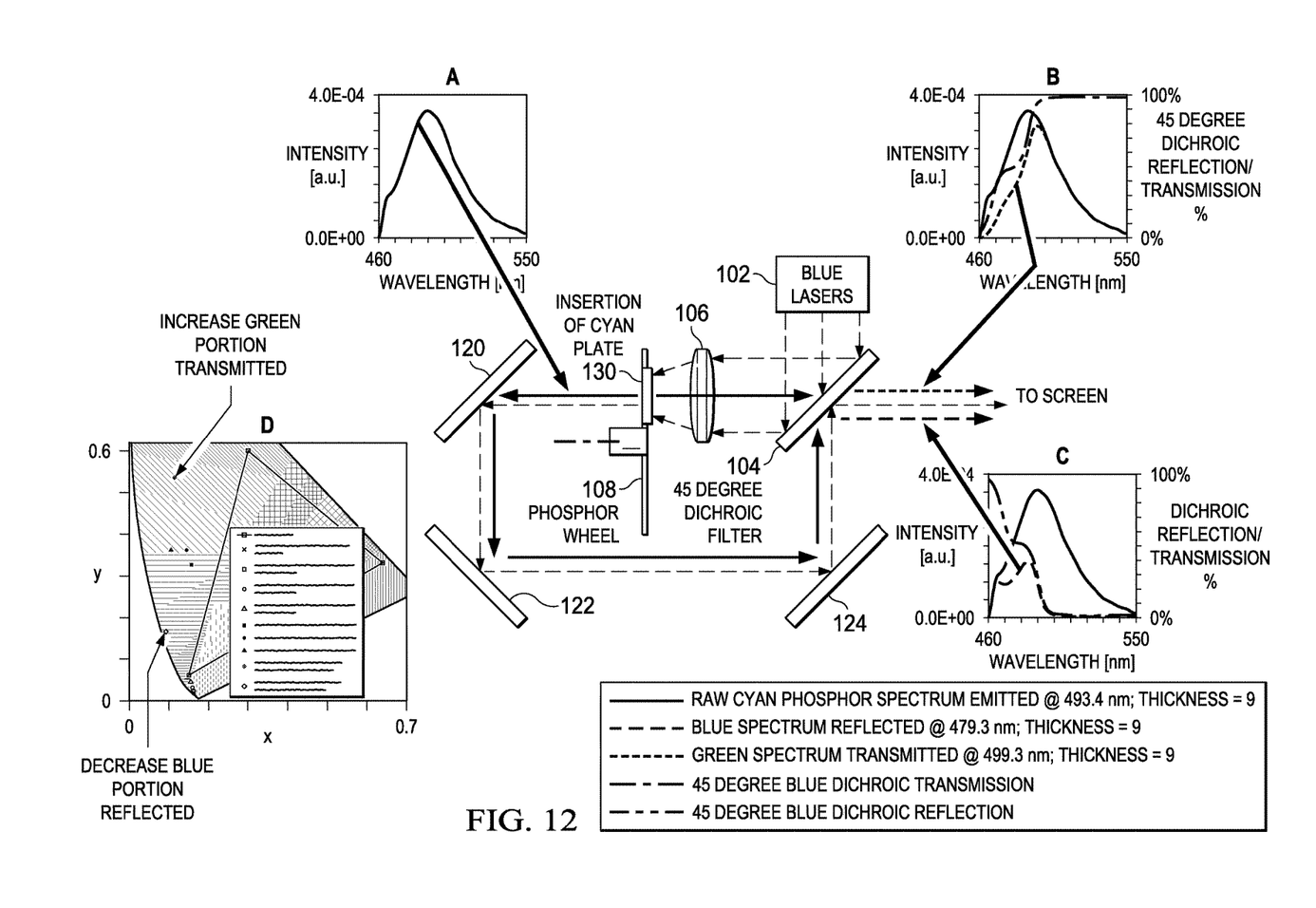
FIGS. 12-13 illustrate a modified arrangement wherein a reflective dichroic filter is added behind the cyan emitting phosphor.
Figure 13:
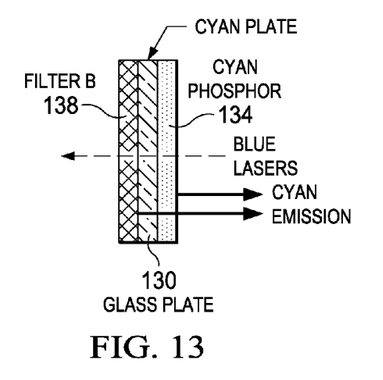

FIGS. 12-13 illustrate the emission characteristics for an arrangement 1200 wherein the glass plates 130 are configured with a blue color transmissive dichroic filter (Filter B) 138 formed parallel with the glass on the back side (wraparound path side) and cyan emitting phosphors 134 forming a coating on the front (projection optics) side. Here, the blue light from the laser source 102 reflected from the 45° filter 104 and incident on the color wheel clear segments 116 energizes the cyan emitting phosphors 134 before passing through the clear segment filter (filter B) 138. In this case, the cyan color light emitted by the phosphor 134 in the forward path direction will be directed forward toward the 45° dichroic filter 104 with a cyan color intensity vs. wavelength profile as described previously. The cyan color light emitted by the phosphor 134 in the rearward (wraparound) path direction, however, will be reflected by filter B 138 to also travel in the forward path toward the 45° dichroic filter 104. In contrast to the arrangement 1000 described for FIGS. 10-11, the pump laser light incident on the cyan emitting phosphor coated clear segments of the color wheel 108 will hit the cyan emitting phosphor 134 first and then the filter B 138 next. Thus, more of the cyan color travels on the forward path than before, and the blue component of the greater amount of cyan directed on the forward path will be transmitted toward the projection optics by the 45° dichroic filter 104, with the green component reflected away from the projection optics by the 45° dichroic filter 104.

For the arrangement of FIGS. 12-13, filter B 138 may be configured like filter A 136 to transmit the blue laser light wavelengths (440-455 nm) but reflect the longer wavelengths (>455 nm). In this case, the profile characteristic of the 45° dichroic filter 104 is, however, shifted left to provide a shorter wavelength cutoff than the nominal cutoff (viz., 490 nm) for FIGS. 8-9. This left shift increases the amount of green transmitted as compared to blue reflected, in order to improve the resultant blue color point (see D).

Figure 14:
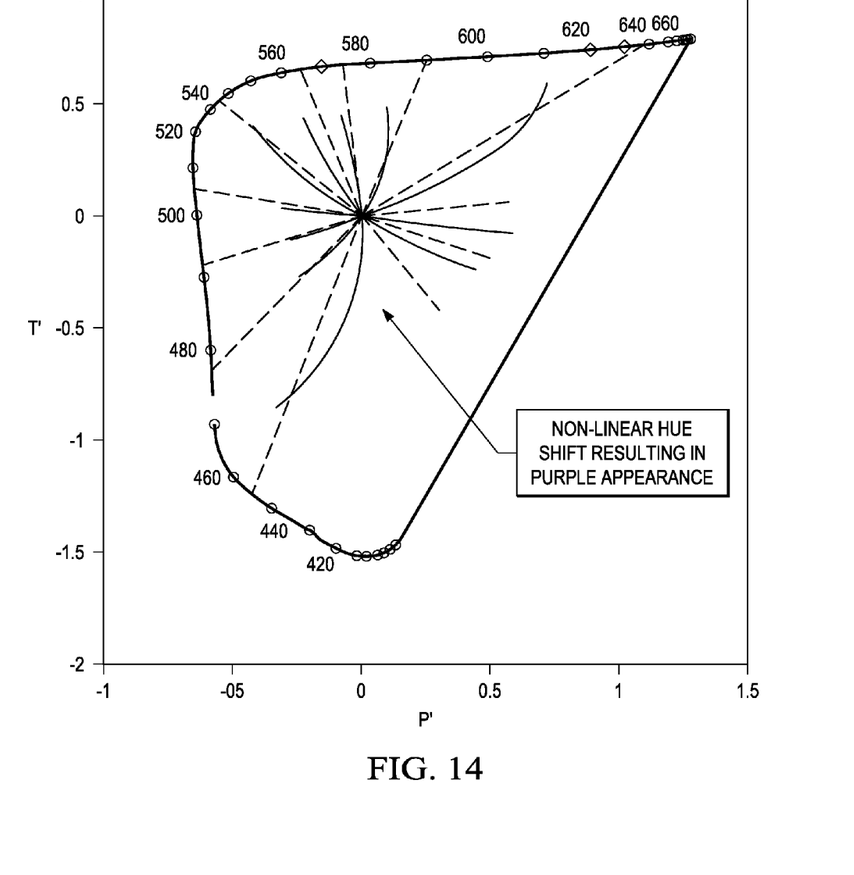
FIG. 14 illustrates an example IPT color space.
Figure 15A:
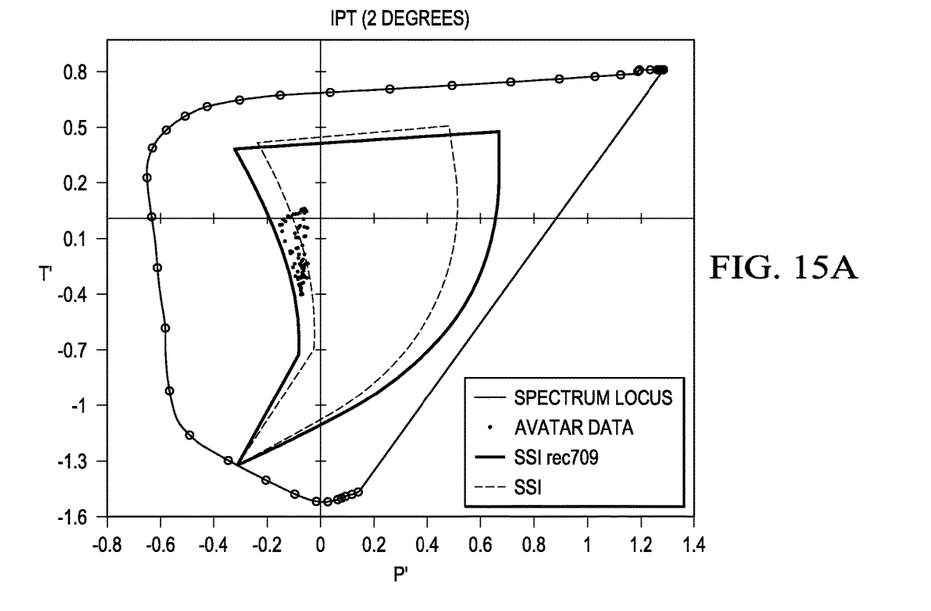
FIGS. 15A-15B illustrates the effect of addition of the cyan to the blue in the IPT color space.
Figure 15B:
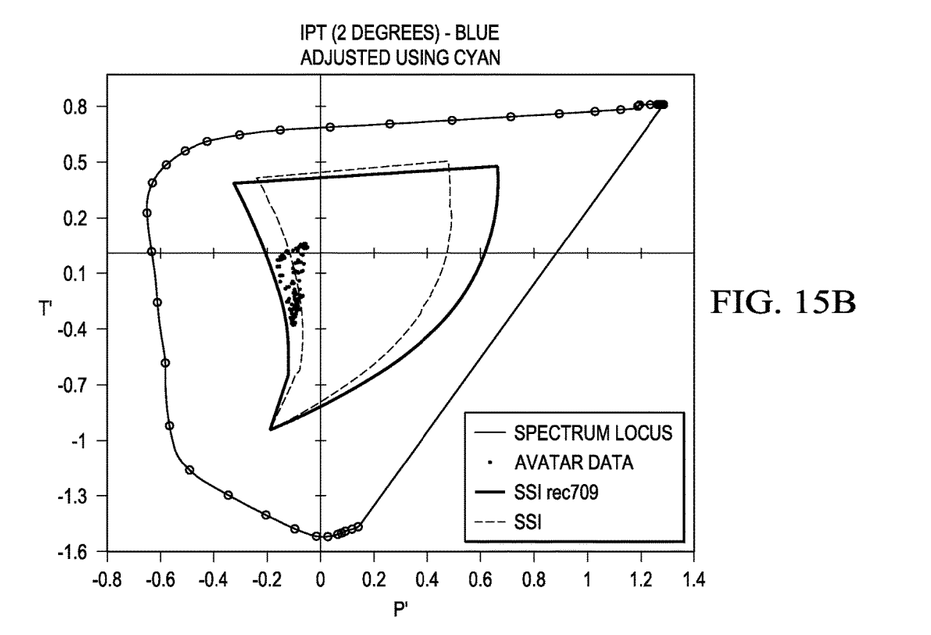

The traditional XYZ color space does not represent the hue perception of the eye correctly. New color spaces have been developed which attempt to linearize the hue response of the eye. The IPT color space is one such color space. An example IPT color space is illustrated in FIG. 14. As shown in FIGS. 15A-15B, the addition of the cyan to the blue moves the cyan region away from the non-linear hue region. Adding even more cyan will continue to move the cyan and blue colors away from this region.

The arrangements described enable the conversion of violet blue laser light (wavelengths of deep UV to 460 nm) into a more pleasing blue light in a reflective phosphor projection architecture via the use of a cyan phosphor plate. The cyan plate includes a glass substrate 130 on which a cyan phosphor is deposited on one side and a multi-layer thin film coating filter is deposited on the other side. An example multi-layer thin film coating filter that may be used has a long reflect filter whose 50% cutoff wavelength is in the range of 420 nm-500 nm. With the cyan plate arrangement illustrated in FIGS. 10-11, the pump laser light is incident on the multi-layer thin film coating filter (filter A) 136 first and then hits the cyan phosphor 134 later. Here, a 45° dichroic filter 104 is used that has a 50% cutoff wavelength shifted right (to a longer wavelength than nominal) so that more of the bluish portion of the cyan phosphor's emission spectrum makes its way through the optical system, thereby improving the resultant color point for the blue color on the displayed image. With the cyan plate arrangement illustrated in FIGS. 12-13, the pump laser light is incident on the cyan phosphor 134 first and then hits the multi-layer thin film coating filter (filter B) 138 later. Here, a 45° dichroic filter 104 is used that has a 50% cutoff wavelength shifted left (to a shorter wavelength than nominal) so that more of the greenish portion of the cyan phosphor's emission spectrum makes its way through the optical system, thereby improving the resultant color point for the blue color on viewing screen. The use of the cyan emitting phosphor in the blue color generation provides de-speckling of the blue laser light via the phosphor plate. The reduction in coherence properties of projected light due to the increased wavelength spread of the resulting light generated through the use of the cyan emitting phosphors reduce coherence properties of light also assists in addressing laser light safety concerns.

The described embodiments enable the use of lower wavelength (wavelengths of deep UV to 460 nm) lasers than when blue light generation depends on laser light only for blue light time segment illumination in PWM color sequence projections. In contrast, current higher wavelength lasers are less efficient and more costly, and current blue LEDs are less efficient, more costly and space inefficient.

Figure 16:
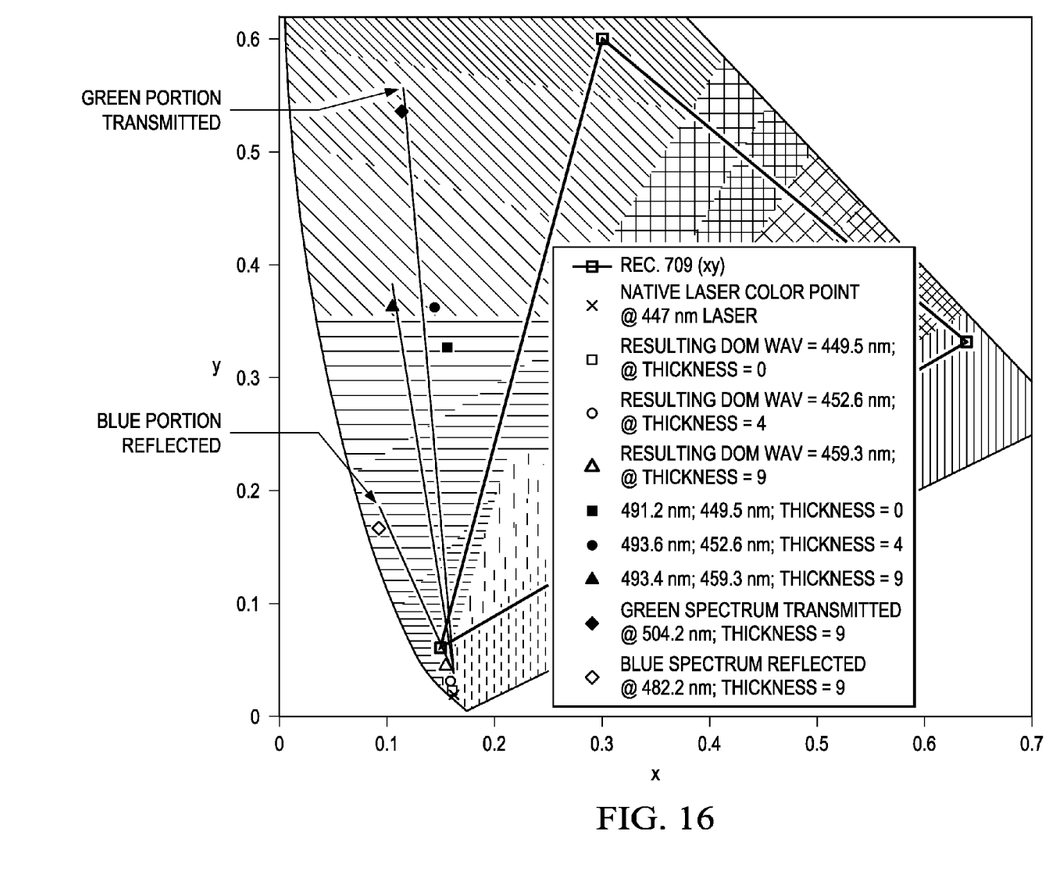
FIG. 16 is an example color space diagram illustrating the reflected blue and transmitted green portions.
Figure 17:
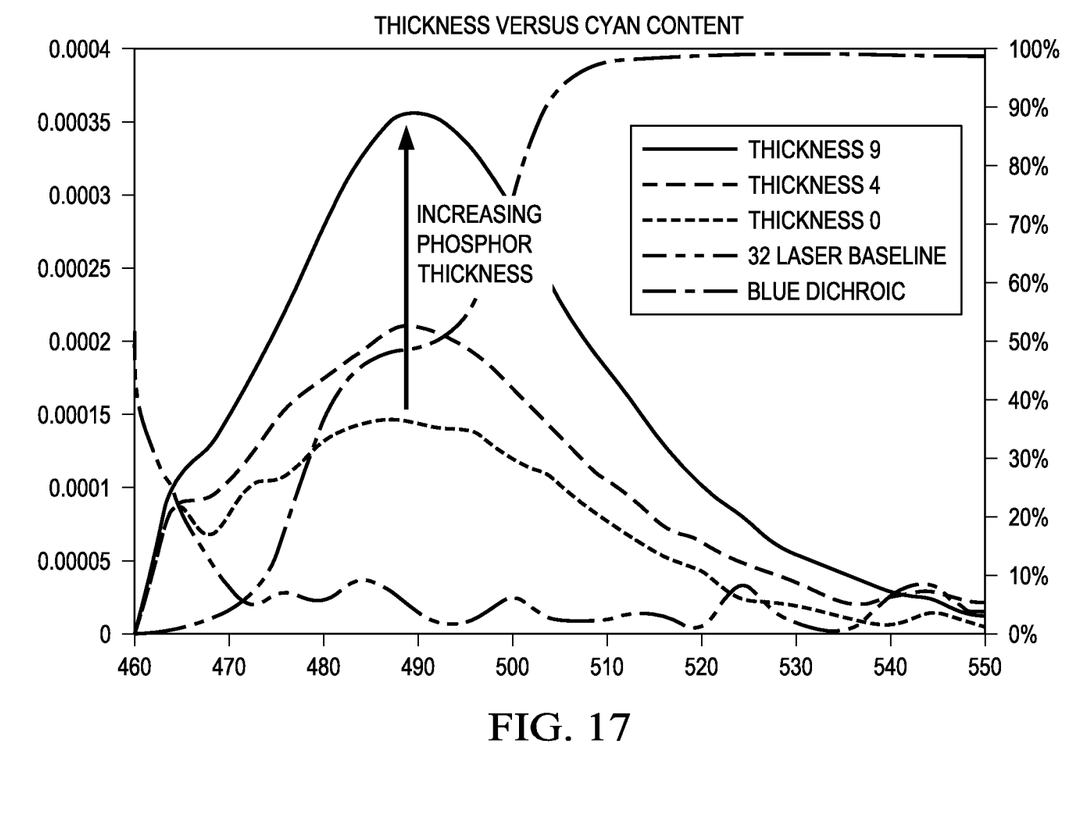
FIG. 17 is a plot of cyan emitting phosphor coating thickness vs. cyan content.

FIG. 16 is an example color space diagram illustrating the reflected blue and transmitted green portions for the indicated characteristics. FIG. 17 is a plot of cyan emitting phosphor coating thickness vs. cyan content, illustrating that increasing the phosphor thickness (e.g. to 9 for the given example embodiments) reduces purple hue and provides benefits to blue color uniformity and de-speckle performance.

Those skilled in the art will appreciate that the described example embodiments may be modified, and also that many other embodiments are possible, within the scope of the claimed invention.

What is claimed is:

1. An apparatus for generating blue color illumination for use in a projection system, comprising:
   a light source for providing blue laser light;
   a color wheel having: segments of respective different color light emitting phosphors formed over light non-transmitting portions of the color wheel; and at least one segment of cyan color light emitting phosphor formed over a light transmitting portion of the color wheel;
   a focusing lens; and
   a dichroic filter for reflecting the blue laser light from the light source through the focusing lens onto the respective segments as the color wheel is rotated to: emit different color light, from the different color light emitting phosphors of the color wheel, back through the focusing lens to the dichroic filter; emit a first portion of cyan color light, from the cyan color light emitting phosphor of the color wheel, back through the focusing lens to the dichroic filter; emit a second portion of cyan color light, from the cyan color light emitting phosphor of the color wheel, through the light transmitting portion of the color wheel and continuing via a wraparound optical path back to the dichroic filter; and transmit blue laser light through the light transmitting portion of the color wheel and continuing via the wraparound optical path back to the dichroic filter;

wherein the dichroic filter is for: transmitting the different color light and at least some of the first portion of cyan color light, which are emitted back from the color wheel, to a projection optical path; and reflecting blue laser light and at least some of the second portion of cyan color light from the wraparound optical path to the projection optical path.

* * * * *